United States Patent [19]

Bajaj

[11] Patent Number: 4,707,312

[45] Date of Patent: Nov. 17, 1987

[54] METHOD FOR PRODUCING CERAMIC ARTICLES OF INCREASED FRACTURE TOUGHNESS

[75] Inventor: Ram Bajaj, Greensburg, Pa.

[73] Assignee: Westinghouse Electric Corp., Pittsburgh, Pa.

[21] Appl. No.: 785,811

[22] Filed: Oct. 9, 1985

[51] Int. Cl.[4] .............................................. C04B 38/00

[52] U.S. Cl. ........................................ 264/43; 264/42; 501/84

[58] Field of Search ........................ 264/42, 43; 501/84

[56] References Cited

U.S. PATENT DOCUMENTS 4,563,432 1/1986 Ehlert .................................. 264/42

FOREIGN PATENT DOCUMENTS 1646560 9/1972 Fed. Rep. of Germany ........ 501/84

OTHER PUBLICATIONS

J. T. Neil, "The Big Three in Structural Ceramics", *Mechanical Engineering;* Mar. 1984; pp. 37–41.

F. F. Lange, "The Interaction of a Crack Front with a Second–Phase Dispersion", *Philosophical Magazine;* 22; 1970; pp. 983–992.

A. G. Evans, "The Strength of Brittle Materials Containing Second Phase Dispersions", *Philosophical Magazine;* 26; 1972; pp. 1327–1344.

G. F. Hurley and F. W. Clinard, Jr., "Fracture Toughness and Hardness of Neutron–Irradiated $Al_2O_3$, $MgAl_2O_4$ and $Y_3Al_5O_{12}$", *DOE/ER*-0048/1; 1980; pp. 51–57.

L. R. Fleischer, J. A. Spitznagel and W. J. Choyke, "Helium Embrittlement of CTR Materials Simulated by Ion Implantation and Hot Isostatic Pressing of Metal Powders", *CONF*-750989, vol. II, 1976, pp. 372–286.

M. D. Rechtin, "A Transmission Electron Microscopy Study of the Defect Microstructure of $Al_2O_3$ Subjected to Ion Bombardment", *Rad. Eff.* vol. 42; 1979; pp. 129–144.

*Primary Examiner*—James Derrington

*Attorney, Agent, or Firm*—R. D. Fuerle

[57] ABSTRACT

Ceramic articles having improved fracture toughness are prepared by ion bombardment of ceramic particles by gas ions to impregnate the particles, cold compacting the gas ion-containing ceramic particles into a form, and hot pressing the gas ion-containing ceramic particle form into a ceramic article whereby gas bubbles are formed in and substantially homogeneously dispersed throughout the ceramic article.

25 Claims, 1 Drawing Figure

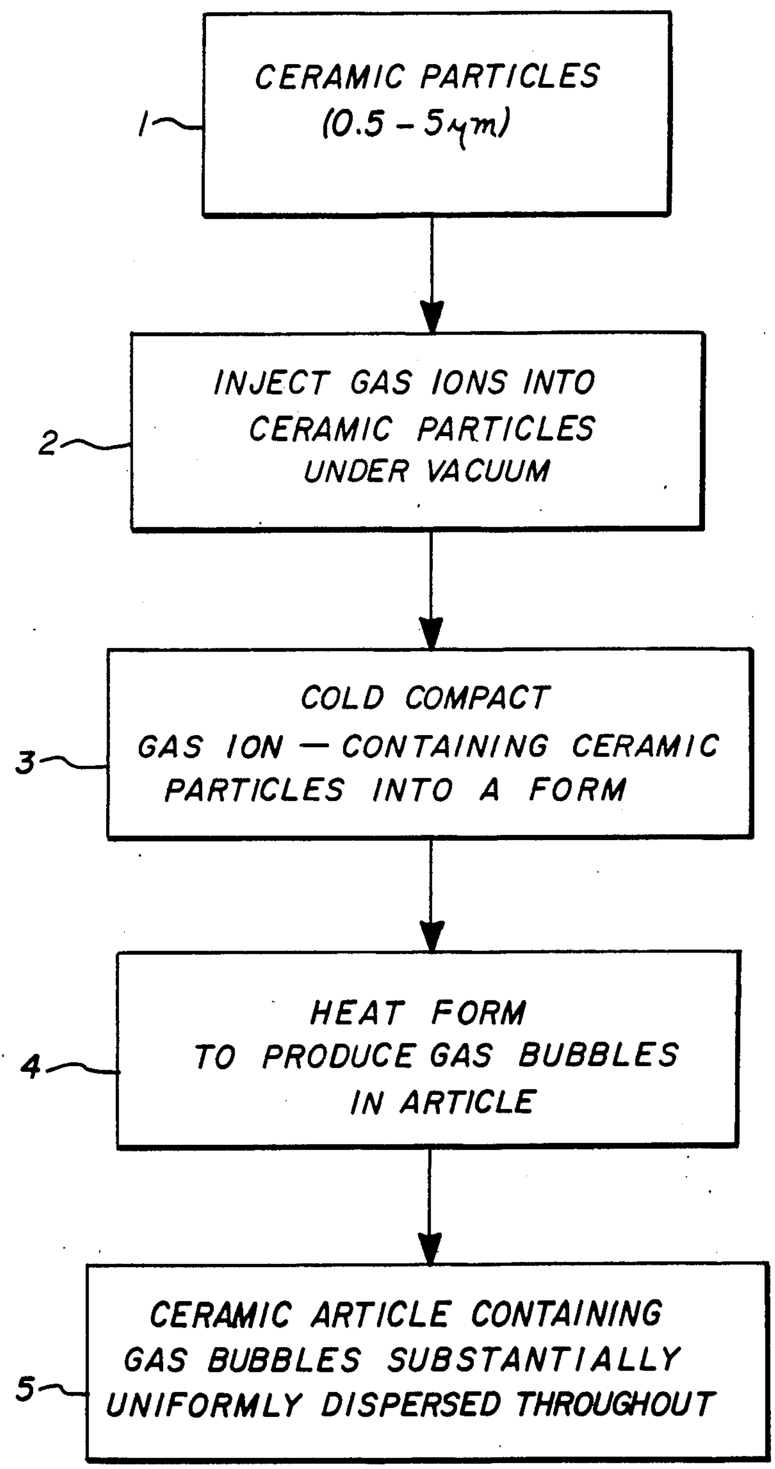
CERAMIC PARTICLES (0.5 - 5μm)
1
INJECT GAS IONS INTO CERAMIC PARTICLES UNDER VACUUM
2
COLD COMPACT GAS ION — CONTAINING CERAMIC PARTICLES INTO A FORM
3
HEAT FORM TO PRODUCE GAS BUBBLES IN ARTICLE
4
CERAMIC ARTICLE CONTAINING GAS BUBBLES SUBSTANTIALLY UNIFORMLY DISPERSED THROUGHOUT
5

METHOD FOR PRODUCING CERAMIC ARTICLES OF INCREASED FRACTURE TOUGHNESS

FIELD OF THE INVENTION

The present invention relates to a method of producing ceramic articles, having improved fracture toughness properties, by powder metallurgical techniques.

BACKGROUND OF THE INVENTION

Structural ceramics such as silicon nitride, silicon carbide, partially stabilized zirconia and partially stabilized alumina are being developed for high temperature applications in heat engines of various types (automotive, gas turbine), tools and dies, and other components because of their high strength at elevated temperatures, and errosion and corrosion resistance. However, because of the inherent brittleness (low fracture toughness) of ceramics, their application potential is not as widespread as it could be if their fracture toughness and ductility were enhanced.

The fracture strength of a ceramic is expressed by the relationship:

$$\sigma_f \alpha K_c (c)^{\frac{1}{2}}$$

where $K_c$ is the fracture toughness (resistance to crack propogation) and c is the size of the critical crack that leads to failure. For a fixed flaw size distribution, therefore, strength is dependent on fracture toughness. Improvements in fracture toughness would undoubtedly enhance the use of such ceramics, especially where resistance to any thermal cycling is desired.

It has been proposed by F. F. Lange, "The Interaction of a Crack Front with a Second Phase Dispersion", Philosophical Magazine, 22 (1970) pp. 983–92 and further developed by A. G. Evans, "The Strength of Brittle Materials Containing Second Phase Dispersion", Philosophical Magazine, 26 (1972) pp. 1327–44, that the strength (hardness) and fracture toughness of ceramics can be increased by crack pinning by dispersed particles of a second phase. The concept is based on an observation of an increase in the length of a crack front when it interacts with two or more inhomogeneities. The theory further developed by Evans showed that significant improvement in fracture energy (toughness) can be achieved by a presence of closely spaced second phase particles.

Evidence of improvement of fracture toughness by a dispersion of voids throughout a solid material was provided by G. F. Hurley and F. W. Clinard, Jr. "Fracture Toughness and Hardness of Neutron-Irradiated $Al_2O_3$, $MgAl_2O_4$ and $Y_3Al_5O_{12}$", DOE/ER-0048/1 (1981) pp. 51–57. They observed an increase in fracture toughness by a factor of 2 in a single crystal alumina which had been neutron irradiated. The irradiation produced an array of voids. They also found a good correlation between theoretically predicted fracture toughness and that observed, assuming the voids to be impenetrable obstacles. While neutron irradiation, with the resultant production of voids can increase the fracture toughness of ceramics, as a technique for producing ceramic with high toughness, such irradiation has several drawbacks. It is costly, it produces an anisotropic distribution of voids, and it renders the material radioactive.

In the present method, bubbles of a gas, such as helium, are homogeneously dispersed throughout a ceramic article to increase the fracture toughness of the ceramic, with the article formed by a powder metallurgical technique.

BRIEF SUMMARY OF THE INVENTION

Ceramic articles of improved fracture toughness are prepared by a process wherein ceramic particles are impregnated with gas ions, the gas ion-containing particles cold compacted into a form and the compacted form is then heated, under pressure, to a temperature in excess of about 1000° C. to produce a ceramic article having gas bubbles substantially uniformly dispersed throughout the article.

The gas ions are preferably inert gas ions, such as helium ions, which are impinged onto and impregnated into ceramic particles, such as silicon carbide, silicon nitride, stabilized zirconia or alumina, of a particle size of between about one-half to five micrometers in diameter. Cold isostatic pressing produces a stabilized form which is then sintered or hot isostatically pressed into an article, whereby the gas ions in the particles form gas bubbles in the ceramic article, the gas bubbles substantially uniformly dispersed throughout the ceramic article produced.

BRIEF DESCRIPTION OF THE DRAWING

The drawing is a flow chart schematically illustrating the process of the present invention.

DETAILED DESCRIPTION

Ceramic articles having improved fracture toughness are produced by the present process wherein ceramic particles are impregnated with gas ions, the impregnated particles compacted, and the compact heated such that the gas ions form bubbles homogeneously dispersed throughout the formed ceramic article.

The present process forms ceramic articles of improved fracture toughness from ceramic compositions such as oxides, nitrides, borides and carbides of silicon, zirconium, aluminum, magnesium, yttrium, and other complex ceramic compounds such as SiAlON. Examples of such ceramic compositions are silicon nitride, silicon carbide, partially stabilized zirconia, alumina, SiAlON, and the like.

The ceramic compositions are provided in a finely divided powdered state with particles in a size of between 0.5–5 micrometers ($\mu m$) in diameter. The small solid particles are of a size which enables impregnation thereof with gas ions at reasonable ion energies.

The ceramic particles are impregnated with gas ions, under vacuum, to produce gas ion-containing ceramic particles. The gas ions used may vary depending upon the ceramic particle components, although inert gases such as helium, argon, neon or krypton are preferred, so as to preclude chemical reaction with the ceramic particles. In instances where a ceramic nitride is used, however, nitrogen might be used as the source of gas ions, while where a ceramic oxide is used, oxygen might be used as the source of gas ions. The impregnation of the ceramic particles with gas ions is effected by impingement of the particles with a high energy beam of accelerated gas ions, under vacuum, at ambient temperature, and preferably with tumbling of the particles. Typically, an ion impingement of the ceramic powder will be effected with a few hundred KeV accelerated beam of gas ions. Preferably, a 150 KeV beam of ions is used, although the energy of the beam may be varied depending upon the particle size of the ceramic material and the accelerated gas specie used. The particles are continuously tumbled during impingement to uniformly expose all of the powder particles to the ion beam using known accelerators and vacuum tumbling systems, such as a rotating cup, for example as described by L. R. Fleischer, J. A. Spitznagel and W. J. Choyke, "Helium Embrittlement of CRT Materials Simulated by Ion Implantation and Hot Isostatic Pressing of Metal Powders", CONF-750989, Vol. II, 1976, pp. 372–386.

The impregnation of the ceramic particles with gas ions is effected at ambient temperatures and the impingement carried out for a period of time sufficient to provide the quantity of ions in the particles that will provide the desired quantity of gas bubbles in the ceramic article produced.

The gas ion-containing particles are then compacted into ceramic articles by first cold compacting to stabilize the same and then hot compacting or sintering. In the cold compacting step, the gas ion-containing particles are compacted at ambient temperature by the application of pressure equally about the supply of gas ion-containing particles. Cold isostatically pressing of the gas ion-containing particles forms a monolithic shape or form which can be subsequently hot compacted. The cold compacting is effected at pressures sufficient to compress the particles to a density of about 65 to 80 percent of theoretical density to provide a form for subsequent hot pressing.

Hot compacting of the gas ion-containing ceramic particles is then carried out with or without pressure to achieve substantially maximum density of the particles. Hot isostatic pressing, at superatmospheric pressure, or sintering at atmospheric pressure, is effected at an elevated temperature, a temperature in excess of about 800° C. Heating and compacting of the form of gas ion-containing particles causes the gas ions to form gas bubbles throughout the article formed, with the gas bubbles substantially uniformly distributed throughout the ceramic article.

The inert gas bubbles formed homogeneously throughout the ceramic article should have a low $c/r_o$ ratio, where 2c is equal to interbubble spacing and $2r_o$ is the bubble diameter. It is preferred that the $c/r_o$ ratio be between 0.1 to 5. Bubble size during the formation of the ceramic articles can be controlled by process parameters such as time, temperature and amount of gas ions present in the ceramic particles. The size of the gas bubbles dispersed throughout the ceramic article must be less than about 1 micrometer in diameter, with much smaller bubbles preferred, such as bubbles of a size of between about 100–400 Angstroms in diameter.

The process is schematically illustrated in the drawing which illustrates a supply of ceramic particles (Step 1) of a diameter of 0.5–5 micrometers, into which gas ions are injected (Step 2) under vacuum. The supply of gas ion-containing ceramic particles are cold compacted (Step 3) into a form that stabilizes the particles, and the form is then heated with or without pressure (Step 4) to produce a ceramic article containing gas bubbles. The finished article (Step 5) comprises a ceramic article containing inert gas bubbles substantially uniformly dispersed throughout the article which induces increased fracture toughness.

The present process, by providing ceramic articles having gas bubbles substantially uniformly dispersed throughout the article, improves the fracture toughness of the article.

What is claimed is:

1. A method of producing ceramic articles having improved fracture toughness properties by a powder metallurgical process comprising:

providing a supply of ceramic particles having a particle size of between 0.5–5 micrometers in diameter;

injecting gas ions into the ceramic particles of said supply of particles by impingement therewith of a beam of accelerated said gas ions to produce a supply of gas ion-containing ceramic particles;

cold compacting said gas ion-containing ceramic particles into a form by applying pressure thereabout; and heating said form at a temperature of at least 800° C., whereby said gas ions form gas bubbles, to produce a ceramic article having gas bubbles substantially uniformly disposed throughout.

2. The method as defined in claim 1 wherein said gas ions comprise ions of an inert gas selected from the group consisting of helium, argon, neon and krypton.

3. The method as defined in claim 1 wherein said heating under pressure produces a ceramic article having a $c/r_o$ ratio of between 0.1 to 5.0, wherein 2c is the interbubble spacing and $2r_o$ is the bubble diameter.

4. The method as defined in claim 1 wherein said ceramic particles are selected from the group consisting of oxides, nitrides, borides and carbides of silicon, zirconium, aluminum, magnesium, yttrium, and SiAlON.

5. The method as defined in claim 4 wherein said ceramic particles comprise silicon nitride.

6. The method as defined in claim 4 wherein said ceramic particles comprise silicon carbide.

7. The method as defined in claim 4 wherein said ceramic particles comprise partially stabilized zirconia.

8. A method as defined in claim 4 wherein said ceramic particles comprise alumina.

9. The method as defined in claim 4 wherein said ceramic particles comprise SiAlON.

10. The method as defined in claim 1 wherein said heating of said form is effected under superatmospheric pressure.

11. The method as defined in claim 1 wherein said compacting of said gas ion-containing ceramic particles into a form is effected to provide a form having a density of about 65 to 80 percent of theoretical density.

12. A method of producing ceramic articles having improved fracture toughness properties by a powder metallurgical process comprising:

providing a supply of ceramic particles having a particle size of between 0.5–5 micrometer in diameter, said ceramic particles selected from the group consisting of oxides, nitrides and carbides of silicon, zirconium and aluminum;

injecting inert gas ions, selected from the group consisting of ions of helium, argon, neon and krypton, into the ceramic particles of said supply of particles by impingement therewith of a beam of accelerated said inert gas ions to produce a supply of inert gas ion-containing ceramic particles;

cold compacting said inert gas ion-containing ceramic particles into a form by applying pressure thereabout; and heating said form at a temperature of at least 800° C., whereby said inert gas ions form gas bubbles, to produce a ceramic article having gas bubbles substantially uniformly dispersed throughout.

13. The method as defined in claim 12 wherein said heating under pressure produces a ceramic article having a $c/r_o$ ratio of between 0.1 to 5.0, wherein 2c is the interbubble spacing and $2r_o$ is the bubble diameter.

14. The method as defined in claim 13 wherein said ceramic particles comprise silicon nitride.

15. The method as defined in claim 13 wherein said ceramic particles comprise silicon carbide.

16. The method as defined in claim 13 wherein said ceramic particles comprise partially stabilized zirconia.

17. The method as defined in claim 13 wherein said ceramic particles comprise alumina.

18. The method as defined in claim 12 wherein said compacting of said inert gas ion-containing particles into a form is effected to provide a form having a density of about 65 to 80 percent of the theoretical density.

19. The method as defined in claim 12 wherein said heating of said form is effected under superatmospheric pressure.

20. The method as defined in claim 1 wherein said ceramic particles are a nitride and said gas ions are nitrogen ions.

21. The method as defined in claim 1 wherein said ceramic particles are an oxide and said gas ions are oxygen ions.

22. The method as defined in claim 1 wherein said particles are tumbled in a vacuum at ambient temperature during said impingement.

23. The method as defined in claim 1 wherein gas ions have an energy of about 150 KeV.

24. The method as defined in claim 1 wherein said gas bubbles are about 100 to about 400 Angstroms in diameter.

25. A method of producing a ceramic article having improved fracture toughness comprising:

(A) injecting ions of an inert gas into ceramic particles that have a diameter of about 0.5 to about 5 microns to produce gas ion-containing ceramic particles;

(B) cold compacting said ceramic particles; and (C) heating said cold compacted particles to a temperature, at least 800° C., sufficient to fuse them into a ceramic article having gas bubbles substantially uniformly disposed throughout.

* * * * *